United States Patent [19]

Deborde et al.

[11] 4,437,352

[45] Mar. 20, 1984

[54] APPARATUS FOR MEASURING BELT TENSION

[75] Inventors: Albert H. Deborde; Michel F. Volland, both of Bourgoin Jallieu, France

[73] Assignee: Saurer-Diederichs (Societe Anonyme), Bourgoin Jallieu, France

[21] Appl. No.: 341,828

[22] Filed: Jan. 22, 1982

[30] Foreign Application Priority Data

Jan. 30, 1981 [FR] France .................. 81 02186

[51] Int. Cl.³ .......................................... G01L 5/06
[52] U.S. Cl. ........................................... 73/862.47
[58] Field of Search ..................... 73/862.47, 862.48

[56] References Cited

U.S. PATENT DOCUMENTS

| 1,694,509 | 12/1928 | Klemperer | 73/862.47 |
| 1,817,203 | 8/1931 | Payne | 73/862.47 X |
| 2,196,099 | 4/1940 | Calame | 73/862.47 |
| 3,203,235 | 8/1965 | Stein . | |
| 3,329,013 | 7/1967 | Beindorf et al. . | |

FOREIGN PATENT DOCUMENTS

| 1267489 | 6/1961 | France | 73/862.47 |
| 2305722 | 10/1976 | France | 73/862.47 |
| 2389880 | 1/1978 | France . | |

Primary Examiner—Charles A. Ruehl
Attorney, Agent, or Firm—Karl F. Ross; Herbert Dubno

[57] ABSTRACT

A apparatus for measuring tension in a strand such as a belt is provided with an elongated housing having a pair of opposite longitudinal ends and respective structures at the ends having structure edges facing transversely in the same direction and generally defining a plane. A two-arm lever is pivoted on the housing between the ends thereof and has an abutment arm extending transversely between the plates and a measuring arm extending generally longitudinally of the housing and having an arm edge lying between the structure edges and facing transversely opposite to the structure edges. A pivot supports the lever on the housing for angular motion about an axis transverse to the housing between two end positions with the arm edge lying on opposite sides of the plane. A spring is braced between the abutment arm and one of the housing ends for urging the lever into the end portion with the arm edge between the plane and the housing. A pointer on the lever cooperate with indicia on the housing to indicate the angular position of the lever.

16 Claims, 6 Drawing Figures

APPARATUS FOR MEASURING BELT TENSION

FIELD OF THE INVENTION

The present invention relates to an apparatus for measuring the tension in a strand such as a belt. More particularly this invention concerns a belt tensiometer of the type usable on a weft-needle belt, automatic-transmission belt, or the like, where the belt tension must be monitored closely or set accurately.

BACKGROUND OF THE INVENTION

In order to measure the tension in a belt or similar strand a standard belt tensiometer is known that has an elongated housing having on its ends two fixed abutments defining a line, and between these two abutments a measuring tip displaceable perpendicularly of this line. The straight-line displacement of the tip perpendicularly to the line of the two abutments is transmitted into angular motion of a dial on a scale by an appropriate transmission. In use the tip is pressed against the belt until the two abutments touch the belt also, at which instant a reading is taken.

Such an apparatus has several serious disadvantages. First of all the reading obtained is frequently inaccurate. This is in part due to the conversion of the straight-line motion of the tip into an angular dial displacement. In addition the user occasionally fails to seat the two abutments on the strand being measured, so the reading is too low.

Another disadvantage with this known system is that the user must exert a substantial lateral deflecting force on the belt in order to measure its tension. This deflecting force must substantially exceed the force that needs to be exerted to determine tension, and is, in fact, frequently enough to stretch the belt slightly and thereby falsify the reading. In fact occasionally a user pushes hard enough on a belt to break it when taking a reading. It is also virtually impossible to take a reading while adjusting the tension, since at least one hand must be occupied holding the tensiometer in place.

OBJECTS OF THE INVENTION

It is therefore an object of the present invention to provide an improved apparatus for measuring the tension in a belt or the like.

Another object is the provision of such an apparatus for measuring the tension in a belt or the like which overcomes the above-given disadvantages.

A further object is to provide an improved belt tensiometer which is easy to use, which can be made cheaply, which will always give an accurate reading, which can be left in place on a strand as its tension is adjusted, and which will work while exerting minimal transverse force on the strand.

SUMMARY OF THE INVENTION

These objects are attained according to the instant invention in an apparatus provided with an elongated housing having a pair of opposite longitudinal ends and respective structures at the ends having structure edges facing transversely in the same direction and generally defining a plane. A two-arm lever is pivoted on the housing between the ends thereof and has an abutment arm extending transversely between the plates and a measuring arm extending generally longitudinally of the housing and having an arm edge lying between the structure edges and facing transversely opposite to the structure edges. Pivot means supports the lever on the housing for angular motion about an axis transverse to the housing between two end positions with the arm edge lying on opposite sides of the plane. Spring means is braced between the abutment arm and one of the housing ends for urging the lever into the end position with the arm edge between the plane and the housing. Means including a pointer and indicia on the lever and housing indicate the angular position of the lever.

With the system of this invention, therefore, the spring is momentarily compressed manually to move the arm edge away from the structure edges so that a strand whose tension is to be measured can be fitted between the opposing edges. The manual compression of the spring is then released so that the strand will be engaged by the edges, with the central arm edge pushing this strand with a force proportional to the spring force against the two opposite structure edges. The angular position of the lever is read on a scale or relative to a mark on the housing to determined the exact tension.

With this system, therefore, the tensionometer can be clipped on the strand whose tension is being measured and, if desired, left in place on the strand as same is adjusted. It will hold itself on the strand. At the same time the tensionometer of this invention only exerts a relatively limited lateral force on the belt, one just sufficient to allow an accurate belt-tension measurement to be taken.

The measurement thus obtained is quite accurate. It is a function only of the fixed spring force and the tension in the belt, not as in the prior art also a function of the force with which the user pushes it against the belt. In addition since the lever position is read directly, any errors created by the conversion of straight-line motion into angular motion, as exist in the prior-art device, are eliminated.

According to another feature of this invention, the housing has a pair of generally parallel end plates having edges constituting the structure edges. One of these end plates has a face on which the spring means bears. The spring means itself includes an abutment-guide fixed on the face and a bent-up tab on the abutment arm and generally parallel to the face. In addition a tube has a closed end carried on the bent-up tab and an opposite open end engaged loosely over the abutment-guide. A compression spring in the tube is braced between the closed end thereof and the abutment-guide. With this arrangement the tube has a length such that it butts longitudinally against the face of the one end plate when the lever is in the end position with its arm edge lying outside the plane of the two structure edges. The maximum compression of the spring is therefore limited, so that once calibrated the device of this invention will stay accurate for a very long time. This structure also allows a relatively weak spring to be used so that the reading can be correspondingly accurate.

The apparatus has calibration means including a screw threaded through the closed end of the tube, and an abutment disk that is carried on the screw and that bears against the spring. Thus screwing the screw in the tube varies the compression of the compression spring. The other plate is formed with a throughgoing hole aligned with this screw so that a tool can be inserted through this hole to rotate the screw and calibrate the tensiometer.

In order to use the device of this invention on a shuttleless loom to measure the tension of the shuttle-needle belts, the end plates are formed with aligned laterally open notches dimensioned to engage over the needle. Such a needle has an inner telescoping section engaging via a toothed wheel with the outer telescoping section. This toothed wheel is driven by the needle belt to move the inner section at a speed twice that of the outer section. In such a machine belt tension must be very tight so no motion is lost, but still not so tight as to damage the guides and so on of the belt.

The arms either intersect generally at the axis, or at a location offset away from the one end from the axis. The latter arrangement increases the sensitivity of the device but decreases its range.

This axis in turn is generally parallel to the plane or line defined by the two structure edges. In addition the pointer is carried on the lever and the indicia on the housing. The indicia can be a scale, a single mark on the housing, or a hole or similar formation on the housing with which the pointer is aligned.

DESCRIPTION OF THE DRAWING

The above and other features and advantages will become more readily apparent from the following, reference being made to the accompanying drawing in which.

SPECIFIC DESCRIPTION

Figure 1:
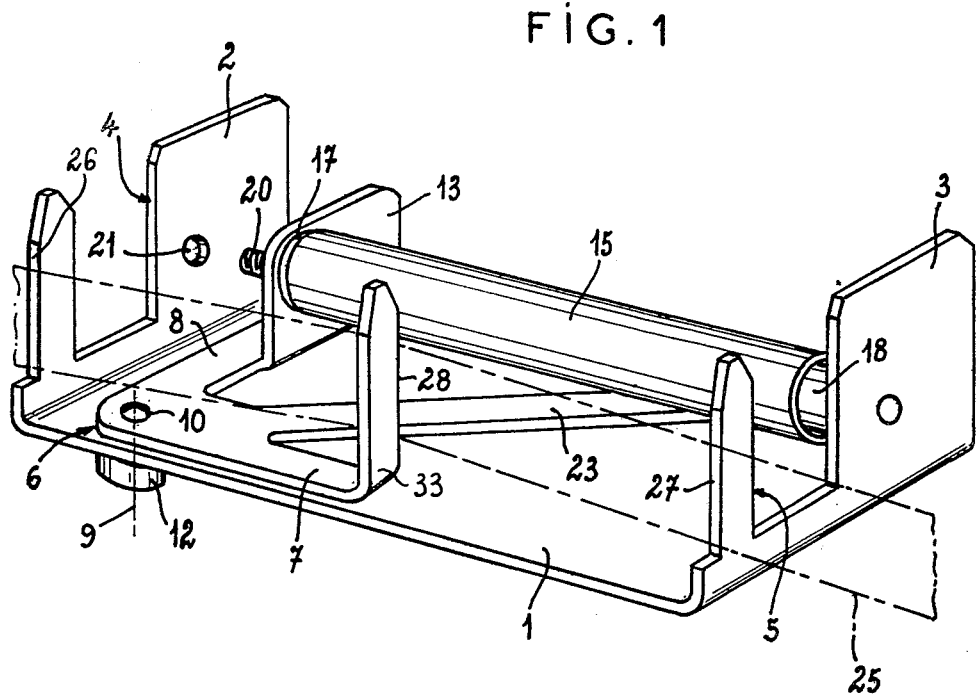
FIG. 1 is a perspective view illustrating the belt tensionometer according to the instant invention.
Figure 4:
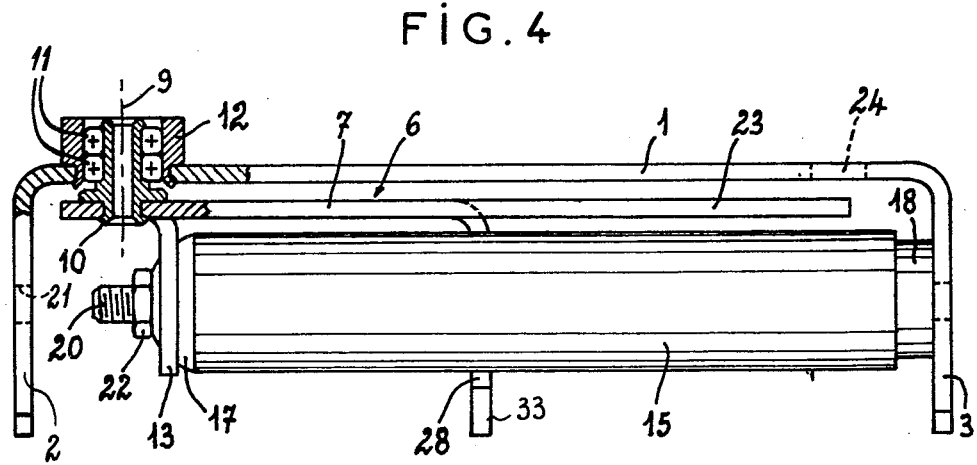
FIG. 4 is a partly sectional view taken in the direction of arrow IV of FIG. 3.

A housing 1 of U-section has a pair of end plates or cheeks 2 and 3 extending parallel to each other and formed with respective rectangular notches 4 and 5 opening in the same direction as seen in FIGS. 1-5. A lever 6 has relatively perpendicular arms 7 and 8 and is pivotal about an axis 9 parallel to the two cheeks or end plates 2 and 3. To this end a tubular axle or pivot 10 is fixed to the lever 6 at the junction of the two arms 7 and 8 adjacent the cheek 2 and is carried by means of small roller bearings 11 in a tube 12 force fitted to the housing 1 adjacent the cheek 2. Thus the lever 6 can pivot easily about the axis 9 to change the distance between the free end of its arm 8 and the cheek 3.

Figure 3:
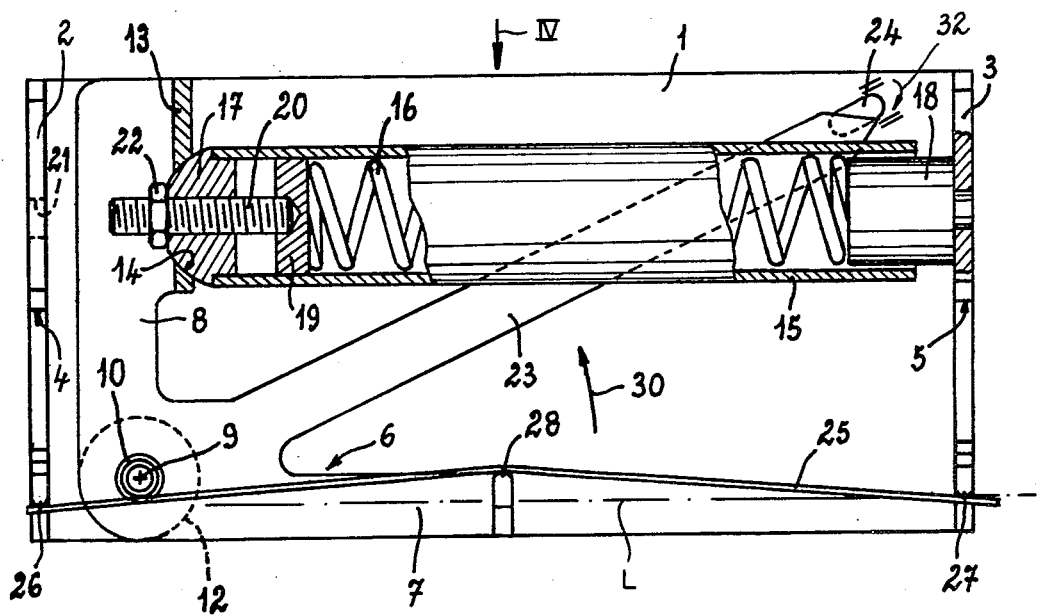
FIG. 3 is a view like FIG. 2 but showing the tensiometer in the measuring or closed position.
Figure 5:
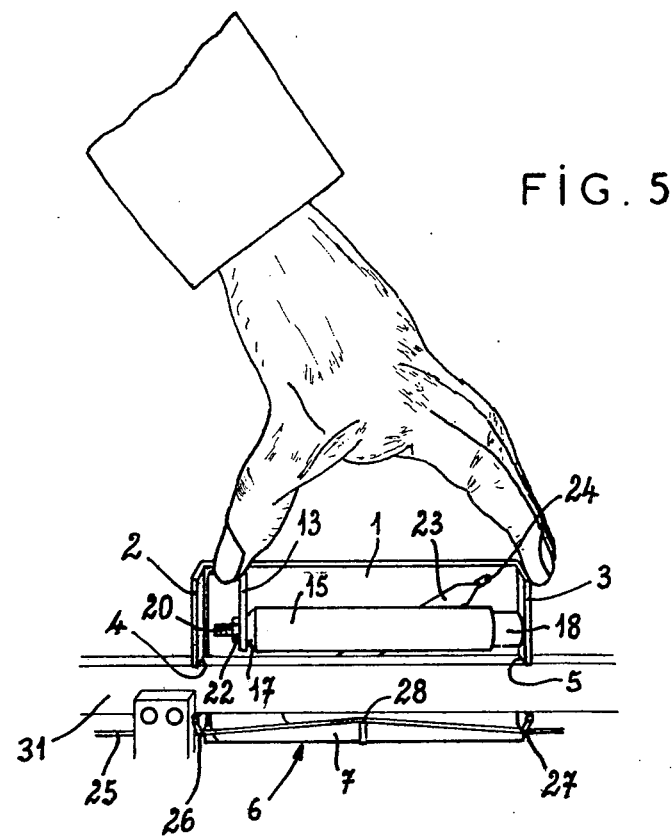
FIG. 5 is a small-scale view illustrating use of the meter of this invention.

The one lever arm 8 is formed with a bent-up tab 13 that extends generally parallel to the cheek 2 in the use or measuring position shown in FIGS. 3 and 5. This tab 13 is formed with a round hole 14 in which is received a centrally threaded end piece 17 fitted into one end of a cylindrical tube 15 which in the use or measuring position shown in FIGS. 3 and 5 is substantially shorter than the distance between the tab 13 and the cheek 3. The other end of this tube 15 fits loosely over a short cylindrical guide 18 fixed on the cheek 3. A compression spring 16 in the tube 15 is braced at one end on the end face of this guide 18 and at the other end on a piston-like plate 19 carried on the end of a screw 20 threaded through the end piece 17. A tool can be inserted through a hole 21 in the cheek 2 to rotate this adjustment screw 20, thereby axially displacing the plate 19 in the tube 15 to adjust the extent of compression of the spring 16. A lock nut 22 on the screw 20 is usually threaded tight against the end piece 17 and is soldered to the screw 20 when the device is calibrated properly.

The lever 6 is also provided between the two arms 7 and 8 with a pointer arm 23 whose tip can move past a marker hole 24 and scale 32 on the housing 2 between the cheeks 2 and 3.

Figure 2:
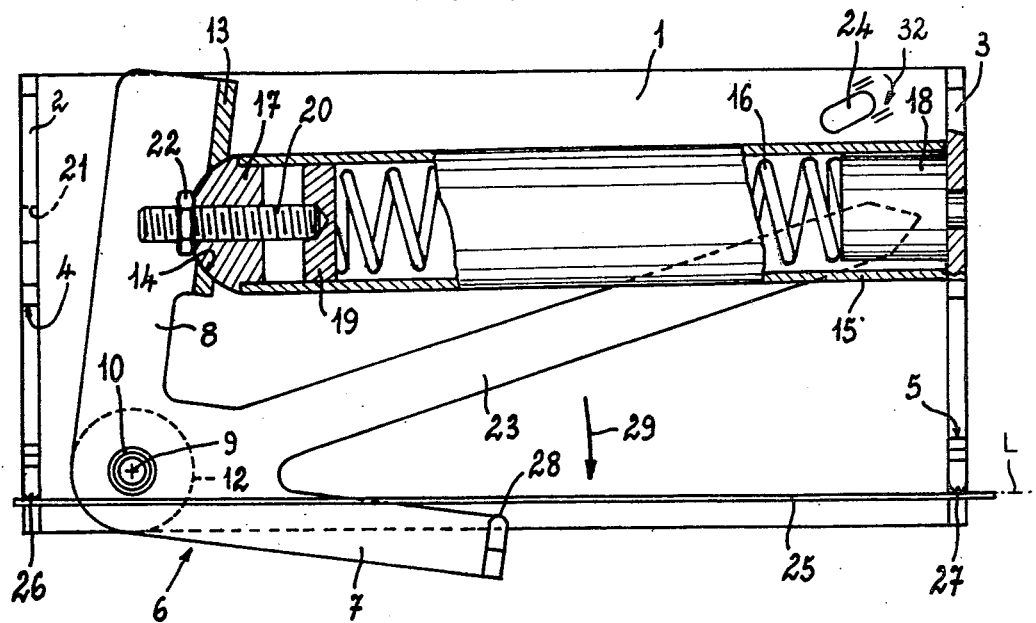
FIG. 2 is a partly sectional view of the tensionometer of this invention in the open position.

In use as shown in FIG. 5 the device is held with the fingers of one hand on the housing 1 at the cheek 3 and the opposing thumb on the bent-up tab 13, with pressure exerted between them to pivot the lever 6 in the direction shown by arrow 29 of FIG. 2 and butt the end of the tube 15 on the cheek 3. This action brings the inside edge 28 of a bent-up end part 33 of the arm 7 outside the straight line L defined by the edges 26 and 27 of the cheeks 2 and 3, respectively. In this position a strand, belt 25 of a shuttleless loom, or the like can pass between this edge 28 on one side and the facing edges 26 and 27 on the other. In the case of a shuttleless loom the notches 4 and 5 can simultaneously be fitted over the needle 31 as also shown in FIG. 5.

The pressure on the tab 13 is then released so the spring 16 pivots the lever 6 as shown in FIG. 3 in the direction of arrow 30 and brings the edge 28 into engagement with the belt 25 midway between the two points 26 and 27. This action deflects or bends this belt 25 to an extent that is a function of the force exerted by the spring 16 and the tension in the bent 25. Since the spring force is constant, this means that the angular position of the lever 6, which can be read off the scale 32, will directly indicate the tension in the belt 25.

Figure 6:
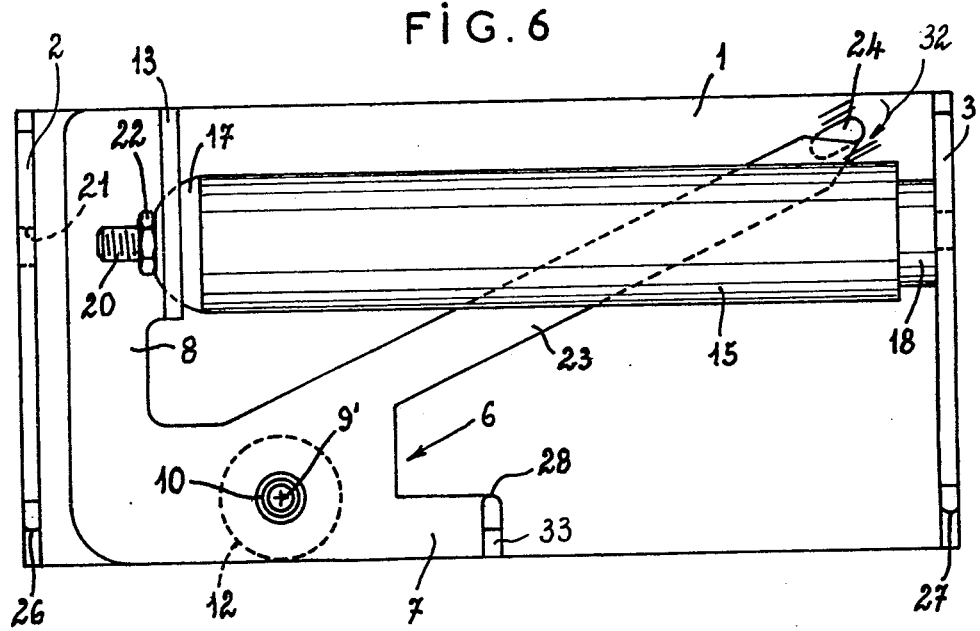
FIG. 6 is a view similar to FIG. 3 of another tensionometer according to the instant invention.

It is also possible as shown in FIG. 6 to move the axis 9' of pivoting of the lever 6 somewhat over from the cheek 2. This construction increases the effective lever-arm length of the arm 8, thereby making the device more sensitive. In addition in FIG. 6 the cheeks 2 and 3 are not formed with the notches 4 and 5.

The device according to this invention is therefore quite simple and easy to use. It rapidly and simply gives an accurate reading of the tension in a strand or belt 25. No special knowledge is needed to operate the tensiometer of the invention, and the device can be made at extremely low cost, even though it can be expected to have a long service life.

We claim:

1. An apparatus for measuring the tension in a straight strand such as a belt, said apparatus comprising:

an elongated housing having a pair of opposite longitudinal ends one of which has a face;

respective structures at said ends having structure edges facing transversely in the same direction and generally defining a plane;

a two-arm lever pivoted on said housing between said ends and having an abutment arm extending transversely between said ends and a measuring arm extending generally longitudinally of said housing and having an arm edge lying between said structure edges and facing transversely opposite to said structure edges;

pivot means supporting said lever on said housing for angular motion about an axis transverse to said housing between two end positions with said arm edge lying on opposite sides of said plane;

an abutment-guide fixed on said face;

a bent-up tab on said abutment arm and generally parallel to said face;

spring means braced between said tab of said abutment arm and said abutment-guide for urging said lever into the end position with said arm edge between said plane and said housing, said spring means including
- a tube having a closed end carried on said bent-up tab and an opposite open end engaged loosely over said abutment-guide, and
- a compression spring in said tube braced between said closed end thereof and said abutment-guide;

means including a pointer and indicia on said lever and housing for indicating the angular position of said lever; and calibration means including:
- a screw threaded through said closed end; and
- an abutment disk carried on said screw and bearing against said spring, whereby screwing said screw in said tube varies the compression of said compression spring.

2. The apparatus defined in claim 1 wherein said housing has a pair of generally parallel end plates forming said structure edges, one of said end plates having said face.

3. The apparatus defined in claim 2 wherein said end plates are formed with aligned laterally open notches dimensioned to engage over the telescopic shuttle needles of a shuttleless loom.

4. The apparatus defined in claim 2 wherein said arms intersect generally at said axis.

5. The apparatus defined in claim 2 wherein said arms intersect at a location offset away from said one end from said axis.

6. The apparatus defined in claim 2 wherein said axis is generally parallel to said plane.

7. The apparatus defined in claim 2 wherein said pointer is carried on said lever and said indicia on said housing.

8. An apparatus for measuring the tension in a straight strand such as a belt, said apparatus comprising:
- an elongated housing having a pair of opposite longitudinal ends formed with respective generally parallel end plates having structure edges facing transversely in the same direction and generally defining a plane, one of said end plates having a face;
- a two-arm lever pivoted on said housing between said ends and having an abutment arm extending transversely between said ends and a measuring arm extending generally longitudinally of said housing and having an arm edge lying between said structure edges and facing transversely opposite to said structure edges;
- pivot means supporting said lever on said housing for angular motion about an axis transverse to said housing between two end positions with said one arm edge lying on opposite sides of said plane;
- spring means braced between said abutment arm and said face of said one end plate for urging said lever into the end position with said arm edge between said plane and said housing; and
- means including a pointer and indicia on said lever and housing for indicating the angular position of said lever.

9. The apparatus defined in claim 8 wherein said spring means includes an abutment-guide fixed on said face and a bent-up tab on said abutment arm and generally parallel to said face.

10. The apparatus defined in claim 9 wherein said spring means includes a tube having a closed end carried on said bent-up tab and an opposite open end engaged loosely over said abutment-guide, and a compression spring in said tube braced between said closed end thereof and said abutment-guide.

11. The apparatus defined in claim 10, further comprising calibration means including:
- a screw threaded through said closed end; and
- an abutment disk carried on said screw and bearing against said spring, whereby screwing said screw in said tube varies the compression of said compression spring.

12. The apparatus defined in claim 8 wherein said end plates are formed with aligned laterally open notches dimensioned to engage over the telescopic shuttle needles of a shuttleless loom.

13. The apparatus defined in claim 8 wherein said arms intersect generally at said axis.

14. The apparatus defined in claim 8 wherein said arms intersect at a location offset away from said one end from said axis.

15. The apparatus defined in claim 8 wherein said axis is generally parallel to said plane.

16. The apparatus defined in claim 8 wherein said pointer is carried on said lever and said indicia on said housing.

* * * * *